United States Patent [19]
Owen et al.

[11] Patent Number: 5,601,787
[45] Date of Patent: Feb. 11, 1997

[54] APPARATUS FOR HOT CATALYST STRIPPING IN A BUBBLING BED CATALYST REGENERATOR

[75] Inventors: Hartley Owen, Belle Mead, N.J.; Paul H. Schipper, Wilmington, Del.

[73] Assignee: Mobil Oil Corporation, Fairfax, Va.

[21] Appl. No.: 893,965

[22] Filed: Jun. 4, 1992

Related U.S. Application Data

[60] Continuation of Ser. No. 726,445, Jul. 5, 1991, abandoned, which is a division of Ser. No. 515,941, Apr. 26, 1990, Pat. No. 5,032,252.

[51] Int. Cl.⁶ .............................. F27B 15/08; B01J 8/04
[52] U.S. Cl. ........................ 422/144; 422/145; 422/146; 422/147; 422/190
[58] Field of Search .................................. 422/143, 144, 422/145, 146, 147, 190

[56] References Cited

U.S. PATENT DOCUMENTS

| | | | |
|---|---|---|---|
| 2,900,329 | 8/1959 | Osborne et al. | 208/164 |
| 3,661,799 | 5/1972 | Cartmell | 252/417 |
| 4,385,985 | 5/1983 | Gross et al. | 208/113 |
| 4,738,829 | 4/1988 | Krug | 422/144 |

*Primary Examiner*—Robert J. Warden
*Assistant Examiner*—Christopher Y. Kim
*Attorney, Agent, or Firm*—Alexander J. McKillop; Malcolm D. Keen; Richard D. Stone

[57] ABSTRACT

An apparatus for multistage, hot stripping of spent FCC catalyst in a regenerator having a stripper supported by the regenerator is disclosed. A secondary stripper, under the conventional primary stripper, is heated indirectly by immersion in a dense bed of hot regenerated catalyst, or heat exchange with a dilute phase transport riser encompassing the primary stripper standpipe and secondary stripper, or by direct contact heat exchange with added hot regenerated catalyst. Vapor from the secondary stripper passes through the primary stripper without contacting spent catalyst in the primary stripper.

7 Claims, 5 Drawing Sheets

APPARATUS FOR HOT CATALYST STRIPPING IN A BUBBLING BED CATALYST REGENERATOR

Cross Reference to Related Applications

This is a continuation of application Ser. No. 07/726,445 filed on Jul. 5, 1991, now abandoned, which is a division of application Ser. No. 07/515,941, filed Apr. 26, 1990, and now U.S. Pat. No. 5,032,252.

BACKGROUND OF THE INVENTION

1. Field of the Invention

The invention relates to a process and apparatus for stripping and regenerating fluidized catalytic cracking catalyst.

2. Description of Related Art

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425 C–600 C., usually 460 C–560 C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500 C–900 C., usually 600 C–750 C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking has undergone progressive development since the 40s. The trend of development of the fluid catalytic cracking (FCC) process has been to all riser cracking and use of zeolite catalysts. A good overview of the importance of the FCC process, and its continuous advancement, is reported in Fluid Catalytic Cracking Report, Amos A. Avidan, Michael Edwards and Hartley Owen, as reported in the Jan. 8, 1990 edition of the Oil & Gas Journal.

Modern catalytic cracking units use active zeolite catalyst to crack the heavy hydrocarbon feed to lighter, more valuable products. Instead of dense bed cracking, with a hydrocarbon residence time of 20–60 seconds, much less contact time is needed. The desired conversion of feed can now be achieved in much less time, and more selectively, in a dilute phase, riser reactor.

Although reactor residence time has continued to decrease, the height of the reactors has not. Although the overall size and height of much of the hardware associated with the FCC unit has decreased, the use of all riser reactors has resulted in catalyst and cracked product being discharged from the riser reactor at a fairly high elevation. This elevation makes it easy for a designer to transport spent catalyst from the riser outlet, to a catalyst stripper at a lower elevation, to a regenerator at a still lower elevation.

Figure 1:
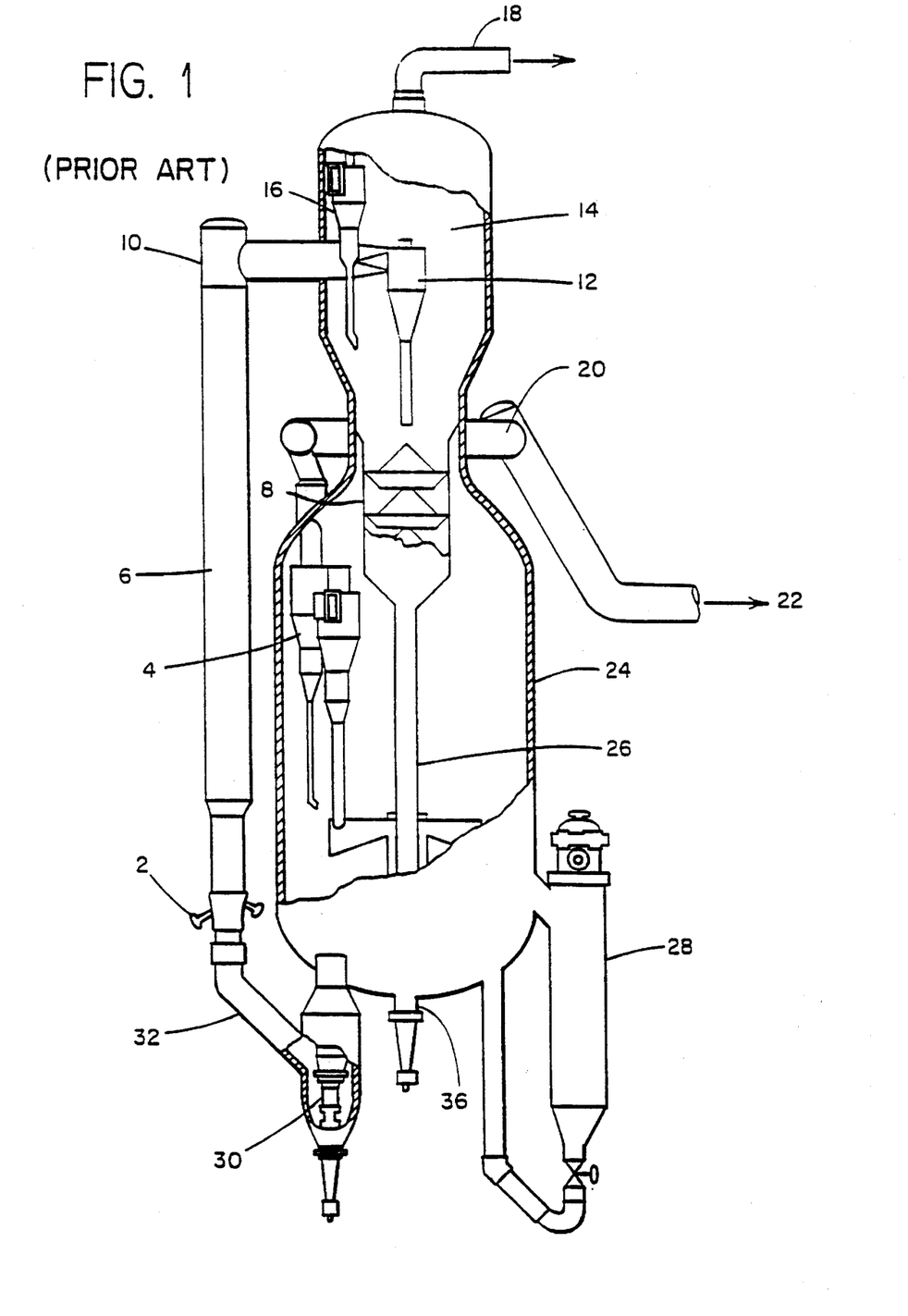
FIG. 1 (prior art) is a schematic view of a conventional fluidized catalytic cracking unit.

The need for a somewhat vertical design, to accommodate the great height of the riser reactor, and the need to have a unit which is compact, efficient, and has a small "footprint" has caused considerable evolution in the design of FCC units, which evolution is reported to a limited extent in the Jan. 8, 1990 Oil & Gas Journal article. One modern, compact FCC design is the Kellogg Ultra Orthoflow converter, Model F, which is shown in FIG. 1 of this patent application, and also shown as FIG. 17 of the Jan. 8, 1990 Oil & Gas Journal article discussed above. The compact nature of the design, and the use of a catalyst stripper which is contiguous with and supported by the catalyst regenerator, makes it difficult to expand or modify such units. The catalyst stripper design is basically a good one, which achieves some efficiencies because of its location directly over the bubbling bed regenerator. The stripper can be generously sized, does not have to fit around the riser reactor as in many other units, and the stripper is warmed slightly by its close proximity to the regenerator, which will improve its efficiency slightly.

Although such a unit works well in practice, the stripping of spent catalyst is never as complete as desired by the refiner. In addition, FCC units are being pushed to accept poorer feeds, particularly feeds containing large amounts of resid. These growing demands placed on FCC units and exacerbated four existing problem areas in the regenerator, namely problems with sulfur, steam, temperature and NOx. These problems will each be reviewed in more detail below.

SULFUR

Much of the sulfur in the feed ends up as SOx in the regenerator flue gas. Higher sulfur levels in the feed, combined with a more complete regeneration of the catalyst in the regenerator increases the amount of SOx in the regenerator flue gas. Some attempts have been made to minimize the amount of SOx discharged to the atmosphere through the flue gas by including catalyst additives or agents to react with the SOx in the flue gas. These agents pass with the regenerated catalyst back to the FCC reactor where the reducing atmosphere releases the sulfur compounds as H2S. Suitable agents are described in U.S. Pat. Nos. 4,071,436 and 3,834,031. Use of cerium oxide agent for this purpose is shown in U.S. Pat. No. 4,001,375.

Unfortunately, the conditions in most FCC regenerators are not the best for SOx adsorption. The high temperatures in modern FCC regenerators (up to 870 C. (1600 F.)) impair SOx adsorption. One way to minimize SOx in flue gas is to pass catalyst from the FCC reactor to a long residence time steam stripper, as disclosed in U.S. Pat. No. 4,481,103 to Krambeck et al which is incorporated by reference. This process preferably steam strips spent catalyst at 500–550 C. (932 to 1022 F.), which is beneficial but not sufficient to remove some undesirable sulfur- or hydrogen-containing components.

STEAM

Steam is always present in FCC regenerators although it is known to cause catalyst deactivation. Steam is not intentionally added, but is invariably present, usually as adsorbed or entrained steam from steam stripping of catalyst or as water of combustion formed in the regenerator.

Poor stripping leads to a double dose of steam in the regenerator, first from the adsorbed or entrained steam and second from hydrocarbons left on the catalyst due to poor catalyst stripping. Catalyst passing from an FCC stripper to an FCC regenerator contains hydrogen-containing components, such as coke or unstripped hydrocarbons adhering thereto. This hydrogen burns in the regenerator to form water and cause hydrothermal degradation.

Steaming of catalyst becomes more of a problem as regenerators get hotter. Higher temperatures greatly accelerate the deactivating effects of steam.

TEMPERATURE

Regenerators are operating at higher and higher temperatures. This is because most FCC units are heat balanced, that is, the endothermic heat of the cracking reaction is supplied by burning the coke deposited on the catalyst. With heavier feeds, more coke is deposited on the catalyst than is needed for the cracking reaction. The regenerator gets hotter, and the extra heat is rejected as high temperature flue gas. Many refiners severely limit the amount of resid or similar high CCR feeds to that amount which can be tolerated by the unit. High temperatures are a problem for the metallurgy of many units, but more importantly, are a problem for the catalyst. In the regenerator, the burning of coke and unstripped hydrocarbons leads to much higher surface temperatures on the catalyst than the measured dense bed or dilute phase temperature. This is discussed by Occelli et al in Dual-Function Cracking Catalyst Mixtures, Ch. 12, Fluid Catalytic Cracking, ACS Symposium Series 375, American Chemical Society, Washington, D.C., 1988.

Some regenerator temperature control is possible by adjusting the CO/CO2 ratio produced in the regenerator. Burning coke partially to CO produces less heat than complete combustion to CO2. However, in some cases, this control is insufficient, and also leads to increased CO emissions, which can be a problem unless a CO boiler is present.

U.S. Pat. No. 4,353,812 to Lomas et al, which is incorporated by reference, discloses cooling catalyst from a regenerator by passing it through the shell side of a heat-exchanger with a cooling medium through the tube side. The cooled catalyst is recycled to the regeneration zone. The Kellogg H.O.C. regenerator has a catalyst cooler connected to the dense bed of the regenerator. These approaches remove heat from the regenerator, but will not prevent poorly, or even well, stripped catalyst from experiencing very high surface or localized temperatures in the regenerator.

The prior art also used dense or dilute phase regenerated fluid catalyst heat removal zones or heat-exchangers that are remote from, and external to, the regenerator vessel to cool hot regenerated catalyst for return to the regenerator. Examples of such processes are found in U.S. Pat. Nos. 2,970,117 to Harper; 2,873,175 to Owens; 2,862,798 to McKinney; 2,596,748 to Watson et al; 2,515,156 to Jahnig et al; 2,492,948 to Berger; and 2,506,123 to Watson.

NOX

Burning of nitrogenous compounds in FCC regenerators has long led to creation of minor amounts of NOx, some of which were emitted with the regenerator flue gas. Usually these emissions were not much of a problem because of relatively low temperature, a relatively reducing atmosphere from partial combustion of CO and the absence of catalytic metals like Pt in the regenerator which increase NOx production.

Many FCC units now operate at higher temperatures, with a more oxidizing atmosphere, and use CO combustion promoters such as Pt. These changes in regenerator operation reduce CO emissions, but usually increase nitrogen oxides (NOx) in the regenerator flue gas. It is difficult in a catalyst regenerator to completely burn coke and CO in the regenerator without increasing the NOx content of the regenerator flue gas, so NOx emissions are now frequently a problem. These problems are more severe in bubbling bed regenerators, because of relatively poor catalyst circulation (large stagnant regions in the dense bed) and the presence of large bubbles of regeneration gas which leads to localized high concentrations of oxygen, which increases NOx emissions.

Recent catalyst patents include U.S. Pat. No. 4,300,997 and its division U.S. Pat. No. 4,350,615, both directed to the use of Pd-Ru CO-combustion promoter. The bi-metallic CO combustion promoter is reported to do an adequate job of converting CO to CO2, while minimizing the formation of NOx.

U.S. Pat. No. 4,199,435 suggests steam treating conventional metallic CO combustion promoter to decrease NOx formation without impairing too much the CO combustion activity of the promoter.

Process modifications are suggested in U.S. Pat. No. 4,413,573 and U.S. Pat. No. 4,325,833 directed to two-and three-stage FCC regenerators, which reduce NOx emissions.

U.S. Pat. No. 4,313,848 teaches countercurrent regeneration of spent FCC catalyst, without backmixing, to minimize NOx emissions.

While such process modifications may be useful for new construction they cannot be easily added to existing units, especially not to compact regenerator/stripper designs such as the Kellogg H.O.C. regenerator.

U.S. Pat. No. 4,309,309 teaches the addition of a vaporizable fuel to the upper portion of a FCC regenerator to minimize NOx emissions. Oxides of nitrogen formed in the lower portion of the regenerator are reduced in the reducing atmosphere generated by burning fuel in the upper portion of the regenerator.

U.S. Pat. No. 4,235,704 suggests that too much CO combustion promoter causes NOx formation, and calls for monitoring the NOx content of the flue gases, and adjusting the concentration of CO combustion promoter in the regenerator based on the amount of NOx in the flue gas.

The approach taken in U.S. Pat. No. 4,542,114 is to minimize the volume of flue gas by using oxygen rather than air in the FCC regenerator, with consequent reduction in the amount of flue gas produced.

All the catalyst and process patents discussed above, directed to reducing NOx emissions, from U.S. Pat. No. 4,300,997 to U.S. Pat. No. 4,542,114, are incorporated herein by reference.

The reduction in NOx emissions achieved by the above approaches helps some but still may fail to meet the ever more stringent NOx emissions limits set by local governing bodies. Much of the NOx formed is not the result of combustion of N2 within the FCC regenerator, but rather combustion of nitrogen-containing compounds in the coke entering the FCC regenerator.

Unfortunately, the trend to heavier feeds usually means that the amount of nitrogen compounds on the coke will increase so NOx emissions will increase. Higher regenerator temperatures also tend to increase NOx emissions. It would be beneficial, in existing refineries, to have a way to reduce NOx emissions so that heavier feeds, and environmental concerns, can be accommodated.

We realized that a better catalyst stripper design is needed. A better stripper would attack most of the problems in the regenerator at their source, namely poor stripping. Better stripping would permit increased recovery of valuable, strippable hydrocarbons and remove more hydrogen from spent catalyst to minimize hydrothermal degradation in the regenerator. It would also remove more sulfur-containing compounds from spent catalyst prior to regeneration to minimize SOx in the regenerator flue gas and would help reduce regenerator temperature by reducing the amount of material burned in it. The problems were obvious, but a solution to these problems, which could be incorporated into existing FCC regenerators, especially compact designs, was not.

We reviewed the work that others had done on improving stripping, and found nothing directly applicable to the special problems of better stripping in FCC units where the stripper was so closely associated with, and supported by, a bubbling dense bed regenerator. The improvements in stripping in FCC units where the stripper was remote from the regenerator were not directly applicable. Thus we could not readily use the hot stripper design of U.S. Pat. No. 4,820,404 (Owen), which is easiest to implement in units where the regenerator is at a higher elevation that the catalyst stripper. For similar reasons we could not use the multi-stage hot strippers of U.S. Pat. No. 4,789,458 (Haddad, Owen, Schatz).

We discovered a way to achieve high temperature stripping of coked FCC catalyst which could be readily retrofitted into strippers operating above and supported by bubbling dense bed regenerators. We discovered a way to make the vices of the existing design, it compactness and proximity to the bubbling bed regenerator, virtues which allowed us to achieve an unexpectedly effective hot stripping design. We found a way to improve stripping, increase the yield of valuable liquid product, reduce the load placed on the catalyst regenerator, minimize SOx and NOx emissions and permit the unit to process more difficult feeds. Regenerator temperatures can be reduced somewhat, and the hydrothermal deactivation of catalyst in the regenerator reduced. All this could be accomplished generally within the confines of existing equipment, and with significantly less regenerated catalyst circulation to the stripper (for direct contact heat exchange) than would be expected based on other hot stripper designs.

BRIEF SUMMARY OF THE INVENTION

In an apparatus embodiment, the present invention provides an apparatus for the fluidized catalytic cracking of a heavy feed to lighter more valuable products comprising: a riser reactor cracking means having a base portion connective with a source of heavy feed and connective with a bubbling dense phase fluidized bed of regenerated catalyst within a catalyst regeneration means; a riser outlet at the top of the riser reactor connective with a catalyst disengaging means adapted to separate a cracked product vapor stream from a spent catalyst stream, and discharge said spent catalyst into a catalyst stripper means; a primary catalyst stripping means, located above and supported by said catalyst regeneration means, said stripping means adapted to receive spent catalyst from said disengaging means and contact said spent catalyst with a stripping gas to produce a stripper effluent vapor stream and a stripped catalyst stream which is discharged down into a primary stripper catalyst standpipe; and a secondary catalyst stripping means, located beneath said primary catalyst stripping means and at least partially within said bubbling dense phase fluidized bed of catalyst within said regenerator vessel, said secondary catalyst stripping means having an upper portion and a lower portion, said upper portion adapted to receive stripped catalyst from said primary stripper catalyst standpipe and a lower portion adapted to receive secondary stripping gas and produce secondary stripper vapor which is discharged via at least one secondary stripping vapor discharge means isolated from and passing through said primary stripping means, to discharge stripping vapor from said secondary stripping means to said cracked product vapor stream, and said lower portion adapted to discharge catalyst into said regenerator means; a catalyst regeneration means adaptive to receive catalyst discharged from said secondary stripping means and maintain said stripped catalyst as a bubbling dense phase fluidized bed of catalyst and regenerate spent catalyst by contact with a source of regeneration gas and produce a regenerated catalyst stream and a dilute phase flue gas stream comprising entrained catalyst.

DESCRIPTION OF PREFERRED EMBODIMENTS

FIG. 1 is a simplified schematic view of an FCC unit of the prior art, similar to the Kellogg Ultra Orthoflow converter Model F shown as FIG. 17 of Fluid Catalytic Cracking Report, in the Jan. 8, 1990 edition of Oil & Gas Journal.

A heavy feed such as a gas oil or vacuum gas oil is added to riser reactor 6 via feed injection nozzles 2. The cracking reaction is completed in the riser reactor, which takes a 90° turn at the top of the reactor at elbow 10. Spent catalyst and cracked products discharged from the riser reactor pass through riser cyclones 12 which efficiently separate most of the spent catalyst from cracked product. Cracked product is discharged into disengager 14, and eventually is removed via upper cyclones 16 and conduit 18 to the fractionator.

Spent catalyst is discharged down from a dipleg of riser cyclones 12 into catalyst stripper 8, where one, or preferably 2 or more, stages of steam stripping occur, with stripping steam admitted by means not shown in the figure. The stripped hydrocarbons, and stripping steam, pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

Catalyst is regenerated in regenerator 24 by contact with air, added via air lines and an air grid distributor not shown. A catalyst cooler 28 is provided so that heat may be removed from the regenerator, if desired. Regenerated catalyst is withdrawn from the regenerator via regenerated catalyst plug valve assembly 30 and discharged via lateral 32 into the base of the riser reactor 6 to contact and crack fresh feed injected via injectors 2, as previously discussed. Flue gas, and some entrained catalyst, are discharged into a dilute phase region in the upper portion of regenerator 24. Entrained catalyst is separated from flue gas in multiple stages of cyclones 4, and discharged via outlets into plenum 20 for discharge to the flare via line 22.

Figure 2:
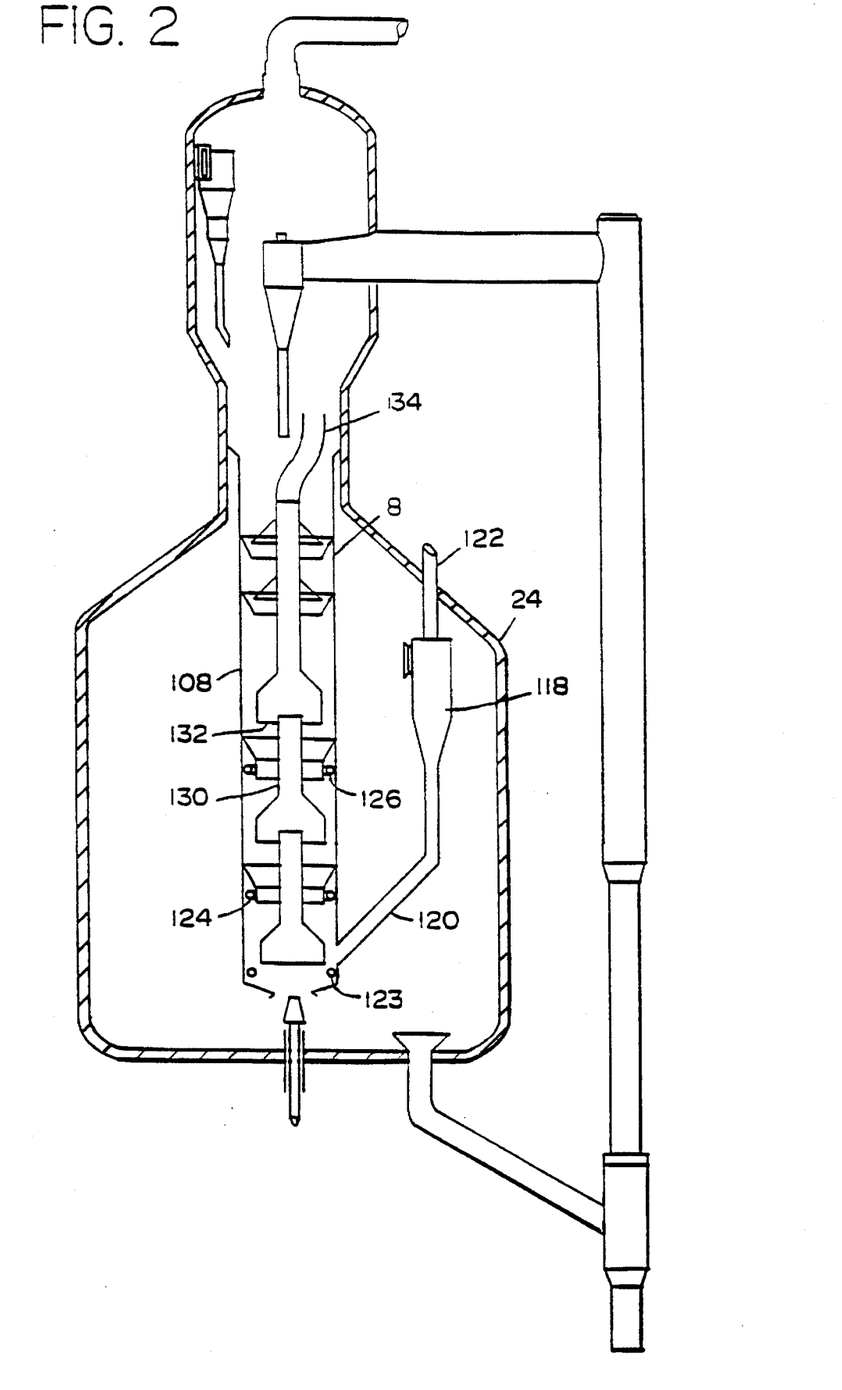
FIG. 2 (invention) is a schematic view of a preferred embodiment of the invention, showing a stripper heated with catalyst from a regenerator cyclone.

In FIG. 2 (invention) only the changes made to the old regenerator shell 24 are shown. Like elements in FIG. 1 and 2 have like numerals.

A multi-stage hot stripper in a standpipe 108 is added to the base of the existing primary catalyst stripper 8. Catalyst from a regenerator cyclone 118, discharged via cyclone dipleg 120 heats the catalyst from the primary stripping zone 8 by direct contact heat exchange. Stripping steam, or other stripping medium, is added by conventional steam addition means 123 and 126. The stripped hydrocarbons, and stripping gas, are preferably removed by multiple withdrawal means, either via side withdrawal means 124, preferably at multiple elevations within the stripper, or via one or more central hot stripper vapor recovery means such as the inverted stacked funnel means 130, defining multiple annular openings 132 connective with central vapor outlet 134 which is connective with the vapor space above the existing primary stripper 8.

The embodiment shown in FIG. 2 has several important advantages over other hot stripper designs. A significant amount of heating of the hot stripper can be done by indirect heat exchange, because the hot stripper is within the regenerator, and preferably is at least partly immersed in the regenerator bubbling dense bed, as shown. This is beneficial in several ways. The catalyst traffic in the stripper, and in the regenerator is reduced somewhat because of indirect, rather than direct contact, heat exchange. This reduces the size and cost of equipment and slightly reduces catalyst fines or dust lost from the regenerator. The hot stripper operation is improved, because the concentration of spent catalyst is higher. Adding hot regenerated catalyst for the purpose of heating spent catalyst dilutes the spent catalyst, making it harder to remove the last traces of strippable hydrocarbon. Adding hot regenerated catalyst also provides additional interstitial space, and to a lesser extent, pore volume, which can entrain stripped hydrocarbons back into the regenerator.

All stripped product from all stages of stripping can be withdrawn together, and sent to product fractionation. Some hot strippers of the prior art produced a hot stripper effluent which was not compatible with the cracked product, i.e., the hot stripper was made hot by partial combustion, and the hot stripper effluent and cracked product effluent could not safely be combined. In other hot stripper designs, the hot stripper would be remote from the primary stripper, so elaborate means had to be provided to get solid and gasses to and from the hot stripper. In this design, catalyst simply falls by gravity into the hot stripper, while stripped product naturally rises.

The FIG. 2 design also overcomes one of the problems of designing a hot stripper that will function well within the confines of a bubbling dense bed regenerator, while being partially above the dense bed. It is beneficial if at least some hot regenerated catalyst can be added to the stripper, but for reasons of pressure balance, and to permit reliable flow control it is essential that the hot stripper, or standpipe from it, be well sealed from the bubbling dense bed. The regenerator has a highly oxidizing atmosphere, while the stripper, and the riser reactor outlet above the stripper, contain hot hydrocarbons. These oxidizing and reducing atmospheres must be well isolated. There can be no opening from the bubbling bed directly into the hot stripper, because this might allow flow reversal, and because there is no "head" of hot regenerated catalyst sufficient to get hot regenerated catalyst into the stripper. The stripper is above the bed, so the tendency of catalyst would be to flow from the stripper into the regenerator, even if pressures in both the stripper and the regenerator were equal.

The FIG. 2 design permits hot regenerated catalyst to be safely added to the hot stripper, but does so without dipping into the bubbling dense bed for catalyst. Catalyst from a regenerator cyclone, preferably a primary cyclone 118 as shown in FIG. 2, is discharged from the cyclone dipleg 120 into the hot stripper. This catalyst is usually hotter than catalyst in the bubbling dense bed, because in most unit some dilute phase after-burning occurs. This catalyst is not only hot, it is high up in the regenerator, and this elevation provides the head needed to drive regenerated catalyst into the hot stripper. One or more flow reversal prevention means, not shown, may be added for safety, such as a flapper valve, or other hydraulic seal arrangements to ensure that the hot stripper will not vent into the regenerator, nor the regenerator vent into the hot stripper. The relatively large elevation of the regenerator cyclone, and the proximity of the hot stripper to the cyclone, permit the use of relatively small diameter catalyst flow lines, and allow use of relatively large dense beds to seal the dipleg.

The FIG. 2 design is also very tolerant of failure of the hot catalyst recycle line, which is an important consideration of any unit which is expected to last for years in the erosive environment of a regenerator. If the cyclone 118 discharges too much catalyst, i.e., is considered to fail in the "open" flow position, all that will happen is that hot stripper will run a little hotter than normal, and hot regenerated catalyst from the cyclone dipleg will be recycled to the bubbling dense bed via the hot stripper, rather than directly to the dense bed. If the cyclone 118, or dipleg 120, fails in the "closed" position, i.e., a plug develops, then the efficiency of the hot stripping operation will drop off some because it will not be as hot. The efficiency of cyclone 118 will fall to zero, because the dipleg will become full, so all catalyst entering will exit with the cyclone exhaust via the cyclone vapor outlet 122, which will increase the duty on the secondary cyclones. Usually the cyclones (both primary and secondary) are used in multiples of 4, 6, or 8, and usually only one or two primary cyclones will be needed to supply hot regenerated catalyst to the hot stripper, so loss of efficiency of one or more cyclones will not be catastrophic, because the other cyclones can usually handle the overflow.

Figure 3:
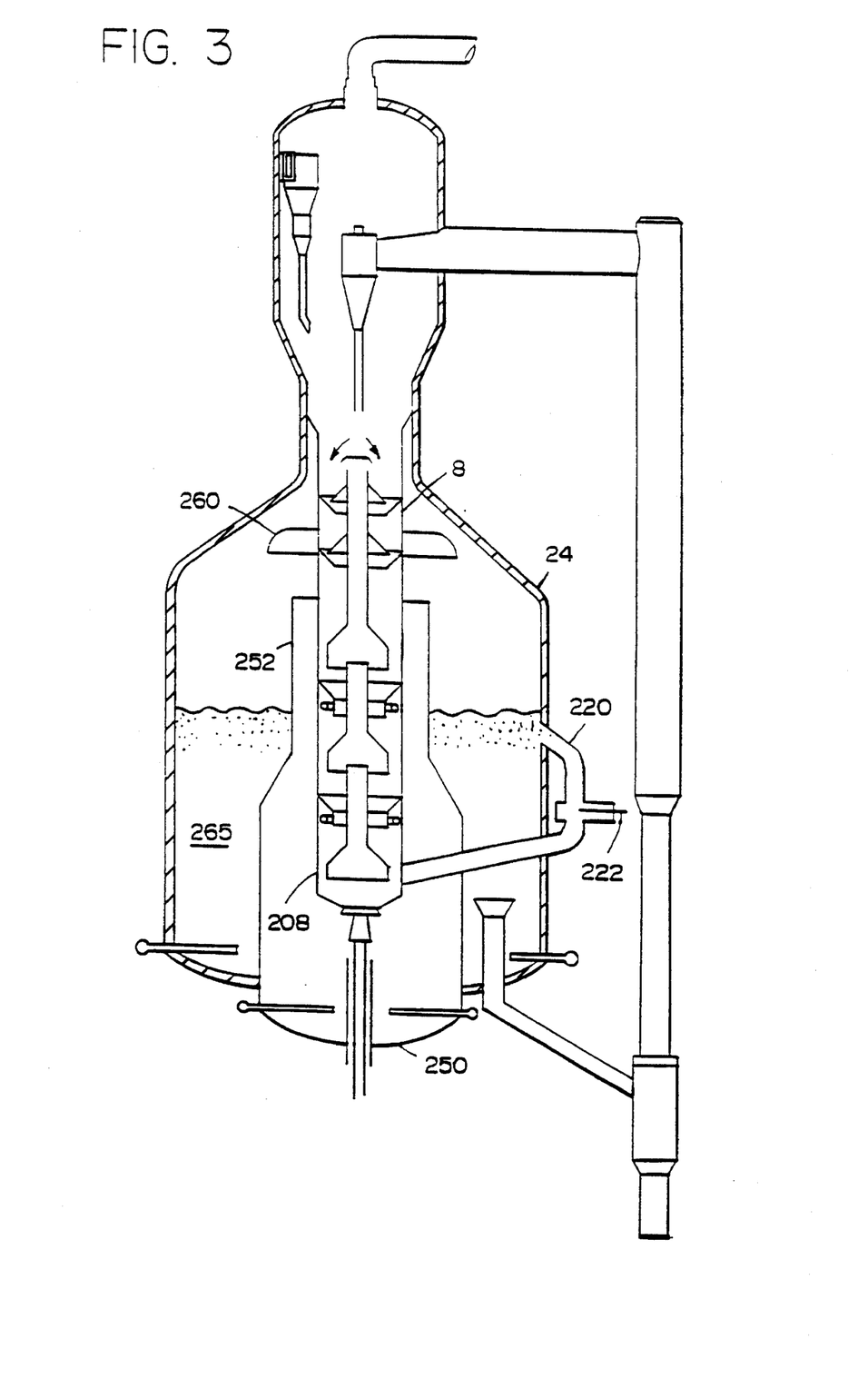
FIG. 3 (invention) is a schematic view of a multi-stage hot stripper of the invention, with a preferred, but optional, fast fluidized bed coke combustor added to the regenerator.

FIG. 3 shows a preferred embodiment of the invention, with a hot stripper and a preferred, but optional, fast fluidized bed region created in the bubbling bed in the base of the regenerator. The FIG. 3 embodiment shows external control of hot regenerated catalyst flow to the hot stripper.

Conventional stripper 8 discharges stripped catalyst into hot stripper 208. Hot stripper 208 is at least partially immersed in a high efficiency regenerator, comprising coke combustor 250 and dilute phase transport riser 252. In the coke combustor, the air admission rate, and the cross-sectional area available for flow, and catalyst addition and catalyst recycle, if any, are adjusted to maintain much or all of the bed in a "fast fluidized condition", characterized by intense agitation, relatively small bubbles, and rapid coke combustion. In terms of superficial vapor velocity and typical FCC catalyst sizes, this means the vapor velocity should exceed 3.5 feet per second, preferably is 4–15 feet per second, and most preferably is 4–10 feet per second. The catalyst density in a majority of the volume in the coke combustor will be less than 35 pounds/cubic foot, and preferably less than 30 pounds/cubic foot, and ideally about 25 pounds/cubic foot, and even less in the upper regions of the coke combustor, where the diameter of the vessel decreases.

The densities and superficial vapor velocities discussed herein presume that the unit operates at a pressure where the vast majority of FCC units operate, namely 25–40 psig. A few might operate at slightly lower pressures, and a significant minority may operate at somewhat higher pressures, primarily those with power recovery systems. Changes in pressure change the superficial vapor velocity needed to maintain, e.g., a fast fluidized bed or a bubbling dense bed. It is easy to calculate the superficial vapor velocity needed to support a given type of fluidization, and the bed density expected at those conditions. In general, an increase in pressure will decrease the superficial vapor velocity needed to achieve a fast fluidized bed.

The arrangement shown provides a significant amount of indirect, counter-current heat exchange of spent catalyst with regenerating catalyst. The first stage of catalyst regeneration takes place in coke combustor 250, which operates as a fast fluidized bed. Partially regenerated catalyst, and flue gas, are discharged from the fast fluidized bed region and pass as a dilute phase up transport riser 252, which encompasses the lower portion of hot stripper 208. Partially or totally regenerated catalyst and flue gas are discharged from the transport riser via cap or deflector 260, which directs catalyst and flue gas down to the bubbling dense bed. The catalyst tends to continue in a straight line to the bubbling dense bed, while the gas flows sideways, so a measure of catalyst separation is achieved. Catalyst discharged from cap 260 is collected as a bubbling dense bed 265. Additional regeneration gas may be added to dense bed 265, for fluffing, and preferably to obtain an additional stage of regeneration.

Because the base of the stripper, in the FIG. 3 embodiment, is well below the level of bubbling dense bed 265 it is possible to transfer catalyst from bed 265 into the hot stripper via line 220 and slide valve 222. Because of the extent of immersion of the hot stripper in the coke combustor and transport riser, and because of the intense fluidization which occurs in both of these regions, the rate of heat transfer into the hot stripper via indirect heat exchange can be very high, so relatively low rates of catalyst recycle via line 220 may be needed. This design will work well even when no catalyst is recycled, provided that conductive, rather than insulating, refractory materials are used to line the inside and outside of hot stripper 208.

Although not shown, it is possible, and usually preferred, to provide a means for recycling some hot regenerated catalyst from bed 265 into the coke combustor 250. If hot stripping is vigorous enough, or at least achieves a degree of heating coupled with modest additional stripping, then catalyst recycle from the bubbling dense bed 265 to the coke combustor 250 may be greatly reduced or eliminated. A catalyst cooler may also be provided on the regenerated catalyst return line to the riser reactor, to permit increasing cat:oil ratios in the unit. A "thimble" cooler, i.e., a vessel connected with and open to some portion of the regenerator may also be used. In this device catalyst flows from a dense bed into the thimble by fluid dynamics, and is displaced from the thimble back into the dense bed by the action of a fluidizing gas. The thimble operates without catalyst supply or return lines, and does not require a slide valve to control catalyst flow, catalyst flow and heat exchange are controlled by the amount of fluidizing gas added to the base of the thimble.

In a preferred embodiment of the invention shown in FIG. 3, a significant amount of combustion air is added to bed 265 both to maintain fluidization and achieve a significant amount of coke combustion. Preferably from 5 to 60% of the coke combustion occurs in the bubbling bed, and most preferably from 10 to 40%. Although bed 265 is a typical fluidized bubbling bed, characterized by relatively large stagnant regions, and large bubbles of combustion air which bypass the bed, it is an excellent place to achieve some additional coke combustion. One of the most significant benefits of coke combustion in bubbling bed 265 is the relatively drier atmosphere. There is a lower steam partial pressure in the dense bed 265 of the present invention than in a conventional dense bed regenerator, such as that shown in FIG. 1. Much of the reduction in steam partial pressure is due to the removal of water of combustion, and entrained stripping steam, with the flue gas discharged from the coke combustor. By using a flue gas/catalyst separation means on the transport riser outlet, the relatively high steam content flue gas is separated from the catalyst which is discharged down to form the bubbling fluidized bed. It is also possible to greatly reduce the load on the cyclones above the bubbling dense bed, because much less combustion air, and consequently less entrainment of catalyst into the dilute phase, is needed when only a fraction of the coke combustion occurs in the bubbling dense bed. Even without a separation means such as cap 260, the dense bed region of the regenerator of the present invention will be drier than the dense bed of the regenerator of FIG. 1 (prior art).

Figure 4:
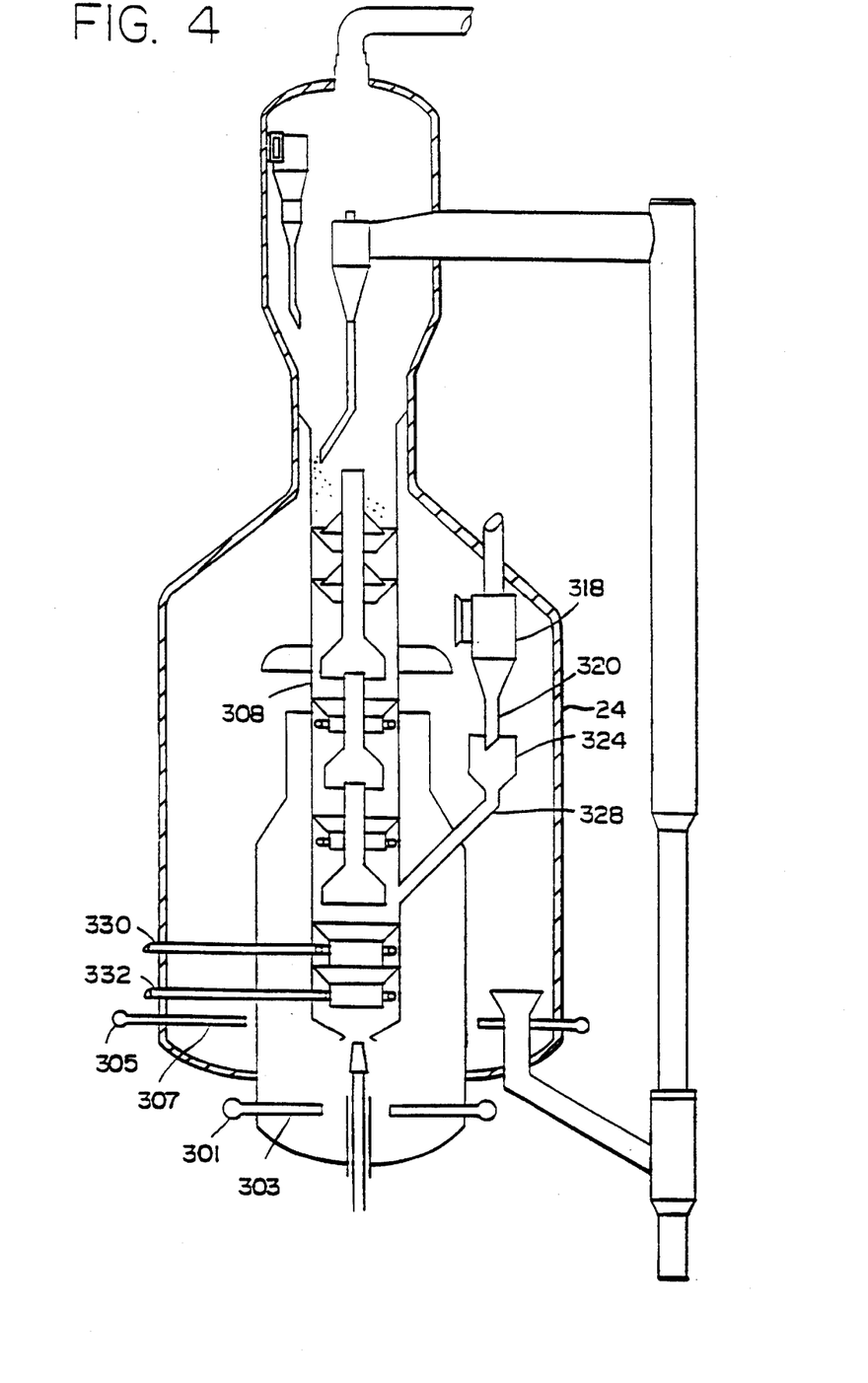
FIG. 4 (invention) is a schematic view of a multi-stage hot stripper of the invention, heated with catalyst from a regenerator cyclone, with an optional fast fluidized bed coke combustor.

FIG. 4 shows another preferred embodiment of the invention, with a hot stripper and a preferred, but optional, fast fluidized bed region created in the bubbling bed in the base of the regenerator. The FIG. 4 embodiment shows internal flow of hot regenerated catalyst to the hot stripper, as opposed to the external flow arrangement of FIG. 3. Conventional stripper 8 discharges stripped catalyst into hot stripper 308. Catalyst for direct contact heat exchange of spent catalyst in the hot stripper 308 is obtained from a cyclone, preferably a primary cyclone 318, which discharges recovered, hot, regenerated catalyst via dipleg 320 into seal pot 324. This pot is designed to allow a predetermined amount of hot regenerated catalyst to flow via line 328 into the hot stripper, while allowing any excess material to overflow seal pot 324.

This embodiment shows several preferred methods of controlling the amount of hot regenerated catalyst that is allowed to enter hot stripper 308. A plurality of steam lines, 330 and 332, are at different elevations in the hot stripper, under or near the outlet of line 328. When large amounts of fluidizing steam are added via line 330, the density of the material above line 330 is greatly reduced, which allows more catalyst to flow into the hot stripper. Addition of more steam via line 332 also reduces density, and can be used to admit more hot regenerated catalyst, and to provide better mixing of spent and regenerated catalyst, and to provide more stripping steam.

Combustion air for the coke combustor is provided via line 301 and air ring 303. Air for additional catalyst regeneration, and for fluffing, for the bubbling dense bed is provided via air line 305 and pipe grid 307.

Figure 5:
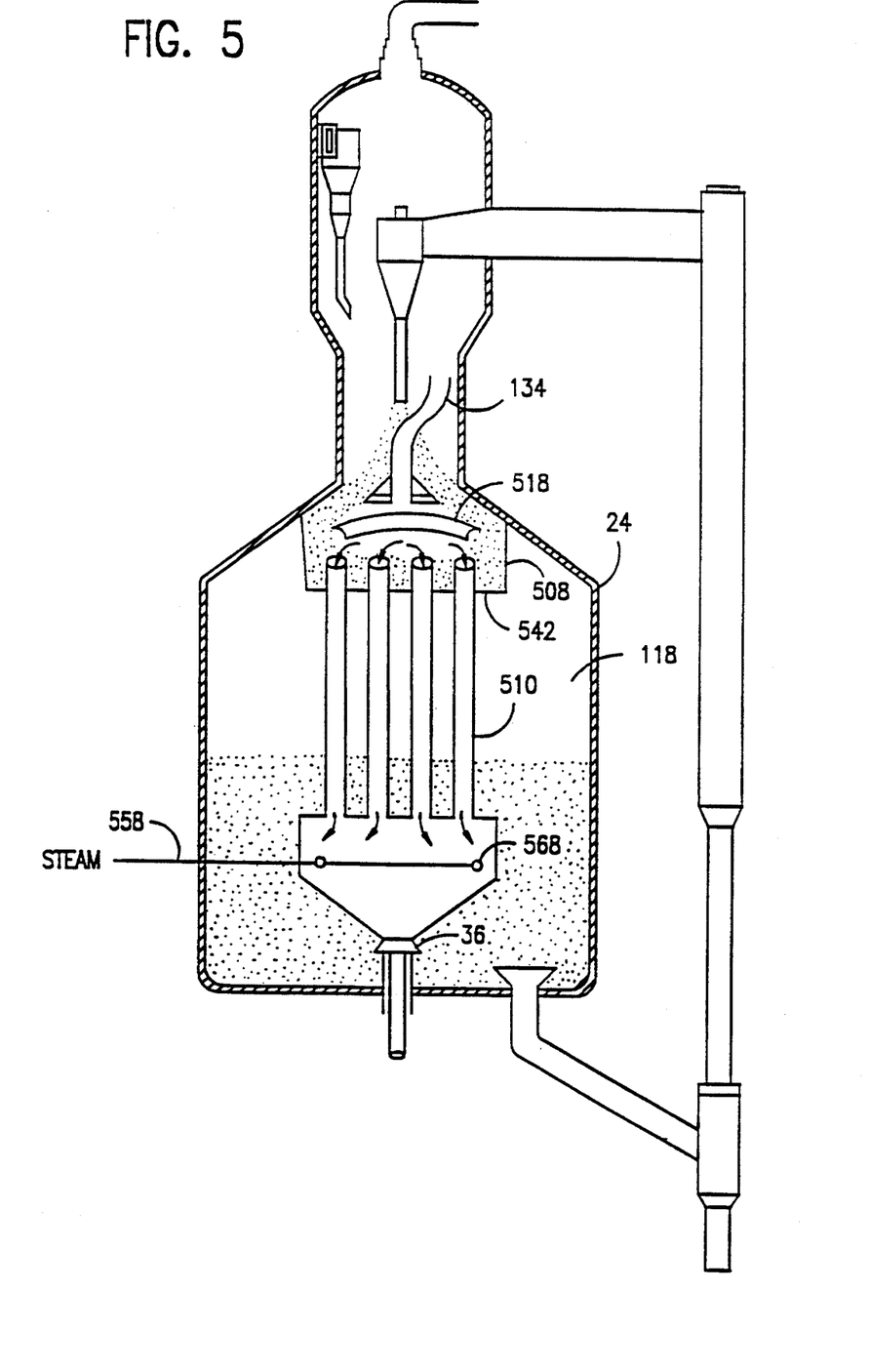
FIG. 5 (invention) is a schematic view of a multi-stage hot stripper of the invention, with a preferred method of indirectly heat exchanging the catalyst in the stripper, and removing stripper vapors.

FIG. 5 shows a multi-stage hot stripper, with hot stripping section 508 below a conventional steam stripper. This embodiment uses a preferred method of indirectly heat exchanging the catalyst in the stripper, and removing stripper vapors.

Spent catalyst, discharged from the riser reactor as in FIG. 1, is subjected to conventional steam stripping. The steam stripped catalyst is charged into an indirectly heated secondary stripper consisting of a plurality of tubes 510. Inlets 512 at the top receive spent catalyst and discharge vapor. Outlets at the base of each tube discharge hot stripped catalyst into the regenerator. Stripping steam is added under each tube 510 via steam line 558 and steam distributor means 568.

Catalyst flows from the primary stripper into each tube 510, and is countercurrently stripped with steam, and indirectly heated, as discussed at length below. The hot stripped catalyst collects under the tubes 510, and then passes into the bubbling dense bed regenerator through plug valve 36, as shown in FIG. 1.

The hot stripper shown in FIG. 5 addresses the problem of heating the stripper sufficiently to see some improvement in catalyst stripping. We realized that the conventional stripper, shown in FIG. 1, never achieved anything approaching the stripping temperatures we wanted, primarily because the stripper, although partially immersed in the regenerator was never efficiently heated by it. Heating was not efficient because there was not much surface area of the stripper exposed to the regenerator. Assuming that a heat transfer coefficient of around 80 BTU/hr/ft2/F could be achieved, the stripper design shown in FIG. 1 would never be heated as much as 10 F., and more likely around 2 F. of heating would be achieved.

We decided to address the problem in two ways. Increase the surface area available for heat transfer, and also increase the efficiency of the stripping operation by partitioning the hot stripper into multiple zones with a very high L/D ratio. A preferred solution is disclosed in FIG. 5.

We took catalyst from a conventional stripper, such as the FIG. 1 stripper, and discharged it down into a hot stripper 508 which is at least partially, and preferably totally, immersed in the dilute phase and perhaps even the dense phase region of the bubbling bed regenerator 24. We used a plurality of tubes 510, with inlets 512 at the top for spent catalyst, and for the discharge of stripper vapor, and outlets at the base of the tube for discharge of stripped catalyst into the regenerator. Stripping gas, preferably steam, is admitted to a lower portion of each tube 510 to strip and aerate the spent catalyst in the tubes. The aeration should be sufficient to promote vigorous stripping, but not sufficient to blow more than minor amounts of stripped catalyst out the tops of the tubes 512.

Using multiple tubes greatly increases the surface area available for heat transfer. In a typical FCC bubbling bed regenerator, use of 20 tubes, each 1' in diameter will increase the heating of the stripper that can be achieved by almost an order of magnitude as compared to the amount of stripper heating that is inherent in the FIG. 1 design.

The removal of stripper vapor from the tubes is facilitated by the use of channel 518 above the tubes 510. This channel isolates the tubes from the rush of catalyst discharged by the primary stripper, and provides for a more orderly addition of spent catalyst to the stripping tubes, and for more orderly withdrawal of stripper vapor. When the tubes 510 are radially disposed, as is preferred, channel 518 may be a generally ring shaped baffle above the tubes. The hot stripper 508 should be sealed from the regenerator, and this is accomplished by providing seal plate 542 around tubes 510. The tubes 510 should be made of stainless steel, or some other equivalent material which is both strong and conductive.

DESCRIPTION OF PREFERRED EMBODIMENTS

FCC FEED

Any conventional FCC feed can be used. The process of the present invention is especially useful for processing difficult charge stocks, those with high levels of CCR material, exceeding 2, 3, 5 and even 10 wt % CCR.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids, and mixtures thereof. The present invention is very useful with heavy feeds having a metals contamination problem. With these feeds, the possibility of reduced burning load in the regenerator, and even more importantly, the possibility of a dryer regenerator, because of reduced hydrogen content of coke, will be a significant benefit.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5–40 wt. % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 Wt % RE.

Relatively high silica zeolite containing catalysts are preferred for use in the present invention. They withstand the high temperatures usually associated with complete combustion of CO to CO2 within the FCC regenerator.

The catalyst inventory may also contain one or more additives, either present as separate additive particles, or mixed in with each particle of the cracking catalyst. Additives can be added to enhance octane (shape selective zeolites, i.e., those having a Constraint Index of 1–12, and typified by ZSM-5, and other materials having a similar crystal structure), adsorb $SO_x$ (alumina), or remove Ni and V (Mg and Ca oxides).

Good additives for removal of SOx are available from several catalyst suppliers, such as Davison's "R" or Katalistiks International, Inc.'s "DeSox."

CO combustion additives are available from most FCC catalyst vendors.

The FCC catalyst composition, per se, forms no part of the present invention.

CRACKING REACTOR/REGENERATOR

The FCC reactor and regenerator shell 24, per se, are conventional, and are available from the M.W. Kellogg Company.

The modifications needed to add the hot stripper, and the preferred but optional combustor pod, or FFB region within, or built partially into, the base of the existing regenerator shell 24 are well within the skill of the art.

FCC REACTOR CONDITIONS

Conventional riser cracking conditions may be used. Typical riser cracking reaction conditions include catalyst/ oil ratios of 0.5:1 to 15:1 and preferably 3:1 to 8:1, and a catalyst contact time of 0.1 to 50 seconds, and preferably 0.5 to 5 seconds, and most preferably about 0.75 to 2 seconds, and riser top temperatures of 900 to about 1050 F.

HOT STRIPPER CONDITIONS

Conventional hot stripping operating conditions may be used. Typical hot stripper operating conditions include temperatures which are at least 20 F. above the temperature in the conventional stripping zone, preferably at least 50 F. above the temperature in the conventional stripper, and most preferably temperatures in the hot stripper are at least 100 F. or more hotter.

A stripping gas or medium, preferably steam, is used to augment stripping. Usually more than 0.1 wt % steam will be added, preferably from 0.15 to 1 wt% and most preferably from 0.2 to 0.4 wt % steam, based on the weight of spent catalyst, is added to the hot stripping zone, in addition to the amount of stripping steam used in the conventional stripper. It is possible, and usually will optimize the overall operation of the unit, if the total amount of stripping steam used, in both the conventional stripper and the hot stripper, is roughly the same or increased only slightly. From 10 to 90%, and preferably 20 to 60%, of the total amount of stripping medium used is added to the hot stripper. This will reduce the amount of steam added to the primary stripper, and reduce the efficiency of the primary stripper, and shift the stripping duty to the hot stripper. In this way, the overall stripping efficiency can be greatly increased, without loading up the process lines with steam, and greatly increasing the production of sour water in downstream units.

The desired heating of spent catalyst in the hot stripper can be achieved by indirect heat exchange, by direct contact heat exchange (recycle of hot regenerated catalyst into the hot stripper) or some combination of both. Each mode of heating will be briefly reviewed.

DIRECT CONTACT HEAT EXCHANGE

When direct contact heat exchange is practiced, it usually will be preferred to recycle an amount of regenerated catalyst equal to 10 to 500% of the spent catalyst, and preferably from 15 to 150% of the spent catalyst. The heat balance equations are fairly simple, because the heat capacity of spent and regenerated catalyst is about the same. A 50/50 mix (100% addition of regenerated to spent) of 1000 F. spent and 1350 F. regenerated catalyst will give a mix temperature of about 1175 F.

INDIRECT HEAT EXCHANGE

Conventional techniques used to calculate the amount of surface needed for heat exchange may be used. In general, only the basic heat transfer equation, Q=UAdT needs to be considered. For a typical FCC regenerator, with a catalyst circulation of 15 tons per minute (30,000 lb/min), it is possible to estimate fairly closely the amount of heat exchange surface needed to achieve a given temperature rise, say 100 F. The heat capacity of the FCC catalyst at these conditions is 0.28 BTU/(#-F), so 50.4 MM BTU/Hr of heat must be transferred. A realistic overall heat transfer coefficient is about 80 BTU/Hr-Ft$^2$-F, provided that the tubes are immersed in, or are very near, a dense phase fluidized bed of catalyst. There is usually not enough heat present in most dilute phase regions to permit rapid heat transfer. One exception is the amount of heat available in a dilute phase transport riser above a coke combustor. Although this stream is, strictly speaking, a dilute phase, it is a dilute phase characterized by a very high solids content, and a high velocity. Any heat exchange tube placed in a dilute phase transport riser will exhibit an even higher rate of heat transfer, well in excess of the heat transfer coefficient obtainable in a classical bubbling, dense phase fluidized bed.

With a dT of about 300 F. (assuming 1000 F. for spent catalyst entering the hot stripper, and 1100 F. for catalyst leaving the hot stripper, and a 1350 F. average temperature in the regenerator), about 2100 ft$^2$ will be needed. This corresponds to 20 tubes 1.0 feet in diameter, 30 feet long. This amount of heat exchanger surface can easily be accommodated in a conventional FCC dense bed regenerator.

When the tubes terminate in an additional vessel which is immersed in the bubbling dense bed, there is additional heat transfer into the bottom of the hot stripper via the entire "wetted" area of the immersed hot stripper

COMBUSTOR POD PROCESS CONDITIONS

Conditions in the optional combustor pod, or FFB region, and in the dilute phase transport riser contiguous with and above it, are very similar to those used in conventional High Efficiency Regenerators (HER) now widely used in FCC units. Typical H.E.R. regenerators are shown in U.S. Pat. Nos. 4,595,567 (Hedrick), 4,822,761 (Walters, Busch and Zandona) and U.S. Pat. No. 4,820,404 (Owen), which are incorporated herein by reference.

The conditions in the combustor pod comprise a turbulent or fast fluidized bed region in the base, and approach dilute phase flow in the upper regions thereof. These conditions are conventional, what is unconventional is achieving fast fluidized bed catalyst regeneration in a bubbling bed regenerator with a superimposed catalyst stripper discharging spent catalyst down directly into the regenerator via a standpipe within the dense bed regeneration vessel.

CO COMBUSTION PROMOTER

Use of a CO combustion promoter in the regenerator or combustion zone is not essential for the practice of the present invention, however, it is preferred. These materials are well-known.

U.S. Pat. No. 4,072,600 and U.S. Pat. No. 4,235,754, which are incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit.

DISCUSSION OF HOT STRIPPING BENEFITS

The hot stripper temperature controls the amount of carbon removed from the catalyst in the hot stripper. Accordingly, the hot stripper controls the amount of carbon (and hydrogen and sulfur) remaining on the catalyst to the regenerator. This residual carbon level controls the temperature rise between the reactor stripper and the regenerator. The hot stripper also controls the hydrogen content of the spent catalyst sent to the regenerator as a function of residual carbon. Thus, the hot stripper controls the temperature and amount of hydrothermal deactivation of catalyst in the regenerator.

Employing a hot stripper, to remove carbon on the catalyst, rather than a regeneration stage reduces air pollution, and allows all of the carbon made in the reaction to be burned to CO2, if desired.

The present invention strips catalyst at a temperature higher than the riser exit temperature to separate hydrogen, as molecular hydrogen or hydrocarbons from the coke which adheres to catalyst. This minimizes catalyst steaming, or hydrothermal degradation, which typically occurs when hydrogen reacts with oxygen in the FCC regenerator to form water. The high temperature stripper (hot stripper) also removes much of the sulfur from coked catalyst as hydrogen sulfide and mercaptans, which are easy to scrub. In contrast, burning from coked catalyst in a regenerator produces SOx in the regenerator flue gas. The high temperature stripping recovers additional valuable hydrocarbon products to prevent burning these hydrocarbons in the regenerator.

Another benefit of hot stripping is reduced solids emissions from the regenerator. In many regenerators, solids content of flue gas is roughly proportional to the solids traffic in the dilute phase of the regenerator. Reducing the solids traffic can reduce the amount of dust and fines that escape the regenerator cyclones. In high efficiency regenerators, catalyst is recycled from a bubbling dense bed to the coke combustor, and this catalyst recycle significantly increases catalyst traffic in the regenerator. The hot stripper of the present invention allows heat to be transferred from the regenerator to the catalyst from the stripper, without recycling catalyst from the regenerator, or at least with a reduced amount of catalyst recirculation. This reduced catalyst load to the coke combustor reduces the amount of catalyst discharged from the coke combustor, and reduces the amount of catalyst traffic in the dilute phase region above the bubbling dense bed downstream of the coke combustor.

We claim:

1. An apparatus for the fluidized catalytic cracking of a heavy feed to lighter more valuable products comprising:

a reactor vessel;

a riser reactor cracking means having a base connective with a source of heavy feed and connective with a catalyst regeneration means containing in a lower portion thereof a bubbling dense phase fludized bed of regenerated catalyst;

a riser outlet at the top of the riser reactor cracking means and within said reactor vessel connective with a catalyst disengaging means for separating a cracked product vapor stream from a spent catalyst stripper stream, and discharging said spent catalyst into a catalyst stripper means, said stripper means having a primary and a secondary stripping means;

said primary catalyst stripping means supported by said catalyst regeneration means, said primary stripping means receiving spent catalyst from said disengaging means and producing a stripper effluent vapor stream and a stripped catalyst stream which is discharged down into a primary stripper catalyst standpipe;

said secondary catalyst stripping means, located beneath said primary catalyst stripping means and at least partially within said lower portion of said catalyst regeneration means, said secondary catalyst stripping means having an upper portion and a lower portion, said upper portion of said secondary stripping means receiving stripped catalyst from said primary stripper catalyst standpipe and said lower portion of said secondary stripping means receiving secondary stripping gas and producing secondary stripper vapor which is discharged, via at least one secondary stripping vapor discharge means isolated from and passing through said primary stripping means, said at least one secondary stripping discharge means extending from said lower portion of said secondary stripping means to said disengaging means, and stripped catalyst which is discharged from said lower portion of said secondary catalyst stripping means; and said catalyst regeneration means, beneath and encompassing said secondary stripping means, receiving stripped catalyst discharged from said secondary stripping means and maintaining said stripped catalyst as a bubbling dense phase fluidized bed of catalyst in a lower portion thereof and regenerating spent catalyst by contact with a source of regeneration gas and producing a regenerated catalyst stream and a dilute phase flue gas stream comprising entrained catalyst;

and wherein said primary catalyst stripping means has a vertical axis and said regeneration means comprises:

a coke combustor means in a lower portion of said regeneration means, having a vertical axis, a base region with a cross sectional area and an upper region of reduced cross sectional area relative to said base region; and said base region is connective with a means for addition of regeneration gas; and a dilute phase transport riser means having a vertical axis, axially aligned with and encompassing both said primary stripping means catalyst standpipe and said secondary catalyst stripping means, said transport riser connective with the upper region of the coke combustor means and transporting catalyst and regeneration gas as a dilute phase from said upper region of said coke combustor up through said transport riser means to an outlet in an upper portion of said transport riser means wherein regenerated catalyst and flue gas are discharged and separated to form a regenerated catalyst stream which collects in said lower portion of said regeneration means.

2. The apparatus of claim 1 wherein said regeneration means comprises at least one stage of cyclone separation means separating catalyst and catalyst fines from the dilute phase flue gas above said bubbling dense bed into a flue gas stream with a reduced catalyst content and a catalyst rich stream which is collected in a cyclone dipleg of said at least one cyclone separation means, and recycled from said cyclone dipleg into said secondary stripping means.

3. The apparatus of claim 1 wherein said secondary stripping means comprises multiple means for stripping gas addition and multiple means for removal of stripping gas and stripped hydrocarbons.

4. The apparatus of claim 1 wherein said secondary stripping means comprises a direct contact heat exchange region within said lower portion of said regeneration means, for heating catalyst in said secondary stripping means by transferring hot regenerated catalyst via a flow control means from said lower portion of said regeneration means to said direct contact heat exchange zone.

5. The apparatus of claim 4 wherein said flow control means comprises a catalyst flow line with a slide valve connective with said lower portion of said regeneration means and with said direct contact heat exchange region of said secondary stripping means.

6. An apparatus for fluidized catalytic cracking of a heavy hydrocarbon feed comprising hydrocarbons having a boiling point above about 650 F. comprising:

a catalytic cracking reactor means comprising a vertical riser reactor having, in a base portion thereof, an inlet means for a source of crackable feed, an inlet means connective with a catalyst regeneration vessel and an outlet means in a top portion thereof for discharging spent catalyst and cracked products;

a catalyst disengaging zone means receiving spent catalyst and separating cracked products from spent catalyst and producing a cracked product vapor phase and a spent catalyst phase, which is discharged down from said disengaging zone;

a primary catalyst stripping means contiguous with and beneath said disengaging zone means and supported by said regeneration vessel, said primary stripping means having:

a spent catalyst inlet in an upper portion receiving spent catalyst from said disengaging zone means,
   a stripper vapor outlet in an upper portion, and
   a catalyst outlet in a lower portion;

a vertical standpipe, having a top and a bottom, beneath said primary catalyst stripping zone means having an inlet in the top connective with said outlet of said primary catalyst stripping means and an outlet in the bottom;

said catalyst regeneration vessel contiguous with and beneath said primary catalyst stripping means, and encompassing said vertical standpipe, said regeneration vessel receiving stripped catalyst and maintaining said stripped catalyst as a bubbling dense phase fluidized bed of catalyst in a lower portion thereof, and having in a lower portion thereof at least one inlet means for an oxygen containing regeneration gas and a regenerated catalyst outlet means;

a secondary stripping means at least partially within said lower portion of said regeneration vessel comprising a plurality of vertical tubes for heating catalyst from said primary stripping means by indirect heat exchange with hot regenerated catalyst, said tubes having:

a plurality of stripped catalyst inlets connective with said outlet of said vertical standpipe of said primary catalyst stripping means;

a plurality of stripping gas inlets for addition of stripping gas to a lower portion of each tube;

a plurality of secondary stripping means catalyst outlets in said lower portion of each tube for discharge of stripped catalyst from said secondary stripping means to said regenerator vessel.

7. The apparatus of claim 6 wherein said secondary stripping means comprises multiple, radially distributed tubes, and wherein a ring shaped baffle is disposed above the tubes.

* * * * *

UNITED STATES PATENT AND TRADEMARK OFFICE
CERTIFICATE OF CORRECTION

PATENT NO. : 5,601,787
DATED : February 11, 1997
INVENTOR(S) : Hartley Owen and Paul H. Schipper It is certified that error appears in the above-indentified patent and that said Letters Patent is hereby corrected as shown below:

Claims

Claim 1: Column 15, line 18, delete "stripper".

Signed and Sealed this

Twenty-ninth Day of April, 1997

*Attest:*

BRUCE LEHMAN

*Attesting Officer*   *Commissioner of Patents and Trademarks*